(12) United States Patent  (10) Patent No.: US 7,115,009 B2
Itoh et al.  (45) Date of Patent: Oct. 3, 2006

(54) OUTBOARD MOTOR (75) Inventors: Jun Itoh, Hamamatsu (JP); Ryuji Hamada, Shizuoka-Ken (JP); Shigeo Unno, Hamamatsu (JP); Shigehisa Hamaguchi, Shizuoka-Ken (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 11/139,696

(22) Filed: May 31, 2005

(65) Prior Publication Data

US 2005/0277343 A1  Dec. 15, 2005

(30) Foreign Application Priority Data

May 31, 2004  (JP) .......................... P2004-162377

(51) Int. Cl.
  *B63H 21/38* (2006.01)
(52) U.S. Cl. ................... 440/88 R; 123/196 W
(58) Field of Classification Search ........... 440/88 R, 440/89 R; 123/195 P, 196 R, 196 W
  See application file for complete search history.

(56) References Cited

U.S. PATENT DOCUMENTS

| 5,778,847 | A | * | 7/1998 | Takahashi et al. ........ 440/88 R |
| 6,126,499 | A | * | 10/2000 | Katayama et al. ........ 440/88 R |
| 6,416,372 | B1 | * | 7/2002 | Nozue ........................ 440/88 R |
| 2003/0041594 | A1 | | 3/2003 | Van Nieuwstadt | |

FOREIGN PATENT DOCUMENTS

| JP | 7-81682 | 3/1995 |
| JP | 2003-74340 | 3/2003 |
| JP | 2004-237846 | 8/2004 |

* cited by examiner

*Primary Examiner*—Lars A. Olson
(74) *Attorney, Agent, or Firm*—Oblon, Spivak, McClelland, Maier & Neustadt, P.C.

(57) ABSTRACT

An outboard motor is provided with a four-stroke-cycle engine and an oil pan disposed below the engine. In the arrangement of the oil pan, a lubricating oil reservoir is arranged on a front side of the oil pan, and an exhaust gas passage and a cooling water passage are arranged on the rear side of the lubricating oil reservoir.

5 Claims, 11 Drawing Sheets

HULL SIDE

OUTBOARD MOTOR

BACKGROUND OF THE INVENTION

1. Field of the Invention

The present invention relates to an outboard motor including an oil pan having an improved structure.

2. Related Art

The outboard motor is generally stored in a state in which the outboard motor is tilted up about a tilting axis of a bracket assembly at a time when the outboard motor is not used. However, in an intermediate or large sized outboard motor having a heavy weight, such tilt-up operation is performed electrically by using a power-tilt and trim (PTT) system equipped to the outboard motor.

On the other hand, a small sized outboard motor is not provided with such PTT system, and the tilt-up operation is performed manually by an operator. However, even such an outboard motor has a relatively heavy weight, and in certain cases, it is difficult to manually perform the tilt-up operation by hands. In order to obviate such defect, there is also provided an outboard motor equipped with an assisting apparatus or device, for example, a gas-assist cylinder device, for assisting the manual tilt-up operation such as disclosed in the Japanese Patent Laid-open (KOKAI) Publication No. HEI 7-81682.

However, the equipment of such assist apparatus results in increasing in the entire weight of the outboard motor and manufacturing cost, while the tilt-up operation may become easy.

SUMMARY OF THE INVENTION

The present invention was conceived in consideration of the matters mentioned above, and an object of the present invention is to provide an outboard motor having an improved arrangement of an oil pan structure capable of manually easily performing tilt-up operation of a power tilt and trim apparatus without using any assist device or like.

The above and other objects can be achieved according to the present invention by providing an outboard motor comprising:

a four-stroke-cycle engine in which a crankshaft is vertically disposed and a cylinder block including cylinders and cylinder heads is arranged and from which a drive shaft extends vertically downward in a state that the outboard motor is mounted to a hull through a bracket assembly;

an oil pan disposed below the engine;

an engine cover covering the engine and the oil pan;

an intake system having an intake port formed to the cylinder head of the engine;

an exhaust system having an exhaust port formed to the cylinder head of the engine; and a driving mechanism operatively connected to the drive shaft extending from the engine, wherein the oil pan is provided with a lubricating oil reservoir disposed at a front portion of the oil pan, and an exhaust passage and a cooling water passage are formed on a rear side of the lubricating oil reservoir.

In a preferred embodiment of the above aspect, the engine is a V-type four-stroke-cycle engine, and the exhaust passage may include a pair of exhaust passage sections vertically penetrating the oil pan. The cooling water passage includes an exhaust cooling water jacket arranged so as to surround the paired exhaust passage sections.

The bracket assembly includes a tilt mechanism having a tilt shaft by which the outboard motor is supported to be tiltable in a vertical direction about the tilt shaft, and it may be desired that a mating surface between a lower surface of the engine and an upper surface of the oil pan is set to a portion upper than a horizontal line passing through an axis of the tilt shaft.

The outboard motor is attached to the bracket assembly via an upper mount unit, and a mounting portion of the upper mount unit is formed to each of both side portions of the lubricating oil reservoir of the oil pan.

The engine includes a valve train of an overhead valve (OHV) structure.

According to the outboard motor of the structure mentioned above, since a gravity point of the outboard motor comes close to the tile shaft of the bracket assembly, it is possible to easily execute tilt-up operation of the outboard motor without using any assisting device or component which is conventionally required. In addition, it is possible to further ascend the gravity point, thus easily performing the tilt-up operation of the outboard motor.

The nature and further characteristic features of the present invention will be made more clear from the following descriptions made with reference to the accompanying drawings.

BRIEF DESCRIPTION OF THE DRAWINGS

In the accompanying drawings:

FIG. 1 is a left side elevational view of an outboard motor provided with an improved oil pan structure according to one embodiment of the present invention in a state mounted to a hull of a boat or like;

DESCRIPTION OF THE PREFERRED EMBODIMENT

One preferred embodiment of the present invention will be described hereunder with reference to the accompanying drawings.

Further, it is to be noted that the terms such as "upper", "lower", "right", "left" and the like terms are used herein with reference to the illustration of the drawings or in a state of the outboard motor mounted to a boat or like.

Figure 1:
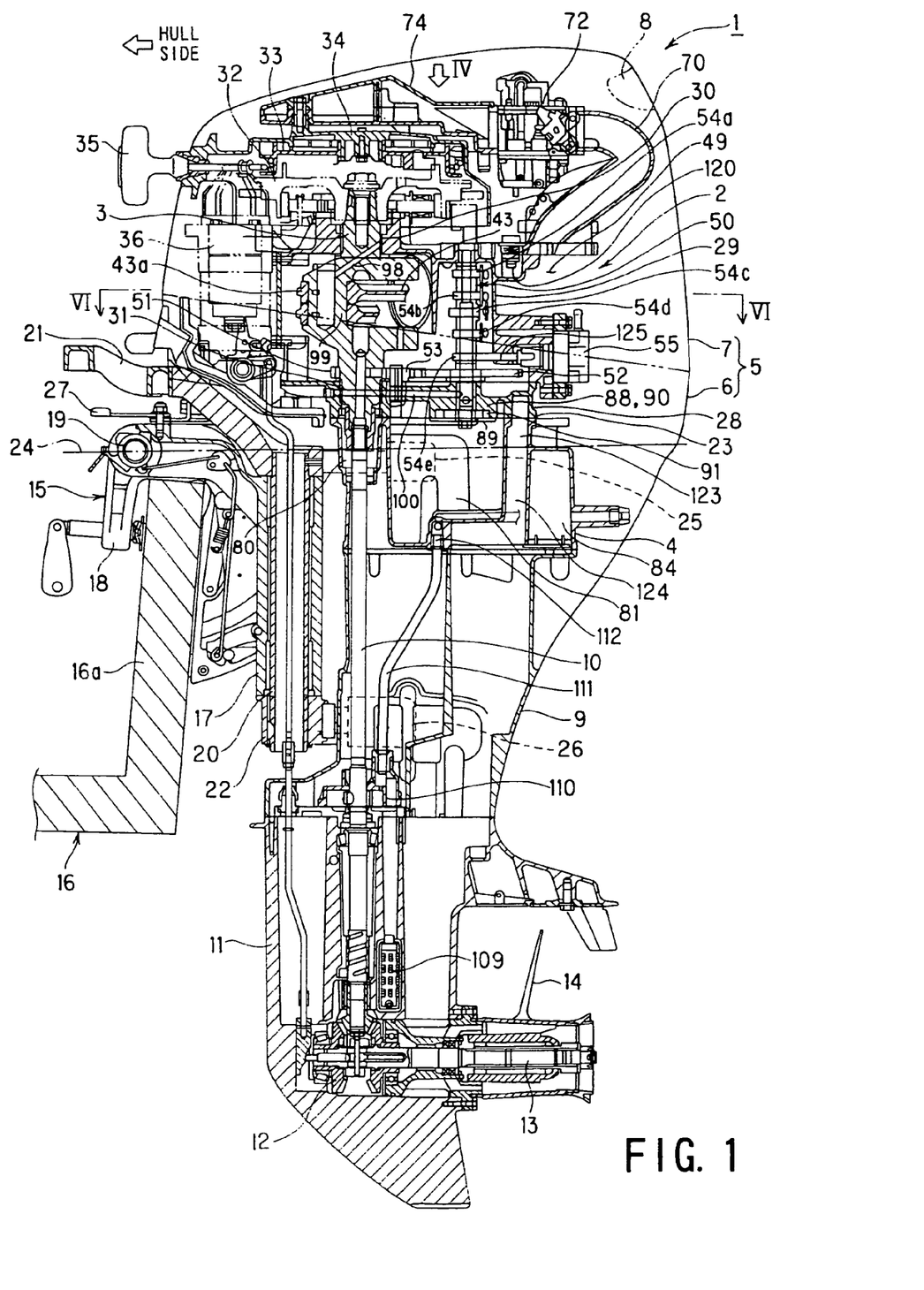

First, with reference to FIG. 1, showing one embodiment of an outboard motor of the present invention, an outboard motor 1 includes a water-cooled four-stroke-cycle V-type two-cylinder engine 2. The engine 2 is so-called a vertical engine in which a crankshaft 3 is approximately vertically arranged.

An oil pan 4 reserving a lubricating oil is arranged below the engine 2. Further, the periphery of the engine 2 and the oil pan 4 is covered by an engine cover 5, which is formed so as to be dividable, for example, into upper and lower sections, the lower cover section 6 covering a lower half of the engine 2 and the periphery of the oil pan 4, and the upper cover section 7 overhanging the lower cover section 6 from an upper side so as to cover an upper half of the engine 2. The lower cover section 6 is formed to be dividable into right and left portions, for example, and is fixed to the side of the outboard motor 1. The upper cover section 7 is attached to the lower cover section 6 to be detachable from an upper side. Further, an air intake port 8 introducing outside air into the engine cover 5 is provided on a rear upper side of the upper cover section 7 so as to be opened rearward.

A drive shaft housing 9 is arranged below the oil pan 4, and a drive shaft 10 as an output shaft of the engine 2 is approximately vertically arranged within the oil pan 4 and the drive shaft housing 9. An upper end portion of the drive shaft 10 is connected to a lower end portion of the crankshaft 3 disposed in the engine 2. The drive shaft 10 extends downward in the drive shaft housing 9 and serves to drive a propeller 14 as a propelling device via a bevel gear 12 within a gear case 11 disposed in a lower portion of the drive shaft housing 9 and a propeller shaft 13.

A bracket assembly 15 is attached to the outboard motor 1, that is, the outboard motor 1 is attached to a transom 16a of a hull 16 of a boat or like via the bracket assembly 15. The bracket assembly 15 is mainly constituted by a swivel bracket 17 and a clamp bracket 18, in which the clamp bracket 18 is fixed to the transom 16a of the hull 16 and the swivel bracket 17 is fixed to the outboard motor 1.

The swivel bracket 17 is pivoted so as to be freely tiltable in a vertical direction about a tilt shaft 19 disposed between a pair of right and left clamp bracket sections, and a steering shaft 20 is pivoted to the swivel bracket 17 in a vertical direction so as to be pivotal. Further, a steering bracket 21 and a mount bracket 22 are provided at upper and lower ends of the steering shaft 20, respectively, to be integrally rotatable.

A mating face, i.e., joining portion, 23 between a lower surface of the engine 2 and an upper surface of the oil pan 4 is designed to be set to an upper side of a horizontal line 24 passing through the tilt shaft 19. Furthermore, a pair of right and left upper mount units 25 are provided for the oil pan 4 and connected to the steering bracket 21. A pair of lower mount units 26 are also provided at both side portions of the drive shaft housing 9 and are connected to the mount bracket 22.

A steering handle, not shown, extending forward is attached to a front end of the steering bracket 21, and the outboard motor 1 can be steered to the right and left about the steering shaft 20 with respect to the bracket assembly 15 by swinging the steering handle to the right and left. Furthermore, it becomes possible to perform the tilt and trim operations toward an upper side about the tilt shaft 19. In addition, a steering adjuster 27, by which a user can optionally set a load of the steering operation, is provided for the bracket assembly 15 of the outboard motor 1. The steering bracket 21 may have a structure connectable to a steering wheel, not shown, through a link mechanism, a cable or the like, not shown, in place of the steering handle.

The engine 2 has a structure to be dividable, in a vertical direction, into two sections of a crankcase 28 placed on an upper side of the oil pan 4 and a cylinder block 29 placed on an upper surface of the crankcase 28. As mentioned above, the crankshaft 3 is approximately vertically arranged within the engine 2. A lower portion of the crankshaft 3 is pivoted to the crankcase 28 and an upper portion of the crankshaft 3 is pivoted to the cylinder block 29 by bearings 30 and 31, respectively.

An upper end portion of the crankshaft 3 protrudes upward outside the cylinder block 29, and a flywheel magnet device 32 for power generation is attached to the protruded upper end portion of the crankshaft 3. A recoil starter 33 acting as an element for manually starting the engine 2 is further arranged at an upper surface of the flywheel magnet device 32. The recoil starter 33 and the flywheel magnet device 32 are covered from their upper side by a flywheel cover 34. A starter grip 35 for actuating the recoil starter 33 is provided so as to protrude forward the engine cover 5, and on the other hand, a starter motor 36 acting as an element for automatically starting the engine 2 is arranged in front of the cylinder block 29. Both the engine starting elements constituted by the recoil starter 33 and the starter motor 36 are not always necessary and either one of them may be provided.

The further description of the present invention will be made hereunder with reference to FIGS. 2 to 6.

As shown in FIGS. 2 to 6 in addition to FIG. 1, a pair of left and right cylinders 37L and 37R expanding in a V-shape in a plan view in a width direction of the outboard motor 1 and extending toward a rear side thereof are formed in the cylinder block 29. Cylinder heads 38L and 38R are provided on the rear sides of the cylinders 37L and 37R, and head covers 39L and 39R are provided on the rear sides of the respective cylinder heads 38L and 38R to be connected in a horizontal direction. One of the left and right cylinders 37L and 37R, i.e., the cylinder 37R in the illustrated embodiment, on the right side facing a forward moving direction of the hull 16 (a starboard side) is arranged so as to be offset to an upper side than the cylinder 37L in the left side (a portside side).

A combustion chamber 40 is formed in each of the cylinder heads 38L and 38R to be matched with each of the cylinders 37L and 37R of the cylinder block 29, and a spark plug 41 is coupled to each of the combustion chambers 40 from an outer side thereof. A piston 42 is inserted into the cylinders 37L and 37R so as to be slidable in the horizontal direction, and the piston 42 and the crankshaft 3 are connected through a connection rod 43 so that a reciprocal stroke of the piston 42 is converted into a rotational motion of the crankshaft 3.

On the other hand, an intake port 44 and an exhaust port 45 which are connected to the combustion chamber 40 are formed within the cylinder heads 38L and 38R. The intake port 44 extends toward an upper side from the combustion chamber 40 within the cylinder heads 38L and 38R, and an inlet 46 thereof is opened to upper surfaces of the cylinder heads 38L and 38R. On the other hand, the exhaust port 45 extends toward a lower side from the combustion chamber 40 in the cylinder heads 38L and 38R, and an outlet 47 thereof is opened to lower surfaces of the cylinder heads 38L and 38R. Further, intake and exhaust valves 48 and 48 for opening and closing the ports 44 and 45 are arranged in the cylinder heads 38L and 38R, and a camshaft 50 for opening and closing the intake and exhaust valves 48 and 48 is also arranged in branching portions of the left and right cylinders 37L and 37R, that is, an inner portion in the cylinder block side of the V-bank 49, on a rear side of the crankshaft 3 to be in parallel to the crankshaft 3, that is, approximately vertically.

A cam drive gear 51 driving the camshaft 50 is disposed at a lower portion of the crankshaft 3, and a cam driven gear 52 is also disposed at a lower portion of the camshaft 50. Both the gears 51 and 52 are operationally connected via a cam idle gear 53 arranged between both the gears 51 and 52 so as to transmit a rotation of the crankshaft 3 to the camshaft 50. In the camshaft 50, there are arranged, in the described order from the upper side, a cam 54a for the intake valve of the starboard side cylinder 37R, a cam 54b for the intake valve of the portside side cylinder 37L, a cam 54c for the exhaust valve of the starboard side cylinder 37R, a cam 54d for the exhaust valve of the portside side cylinder 37R and a cam 54e for driving a fuel pump 55, which will be mentioned below. In this case, the cam idle gear 53 is pivoted in a cantilever supported state to the crankcase side and is arranged in a manner offset to the cylinder 37R also offset on the upper side, i.e., on the right side toward the advancing direction of the hull 16, i.e., the starboard side, in the present embodiment.

The engine 2 is provided with an overhead valve (OHV)-type valve train (OHV-type valve moving mechanism) 56, and a push rod 57 arranged on a side portion of the V-bank 49 in the cylinders 37L and 37R is moved in its axial direction by a profile of the cams 54a to 54d through the rotation of the camshaft 50, thereby rocking or swinging a rocker arm 58 slidably provided within the cylinder heads 38L and 38R. The intake and exhaust valves 48 and 48 within the cylinder heads 38L and 38R are operated by the swinging or rocking motion of the rocker arm 58 so as to be opened and closed.

A decompression device 59 which carries out decompression in the combustion chamber 40, at a time of starting the engine 2 to thereby improve starting performance, is arranged in an inner portion of the camshaft 50.

Figure 7:
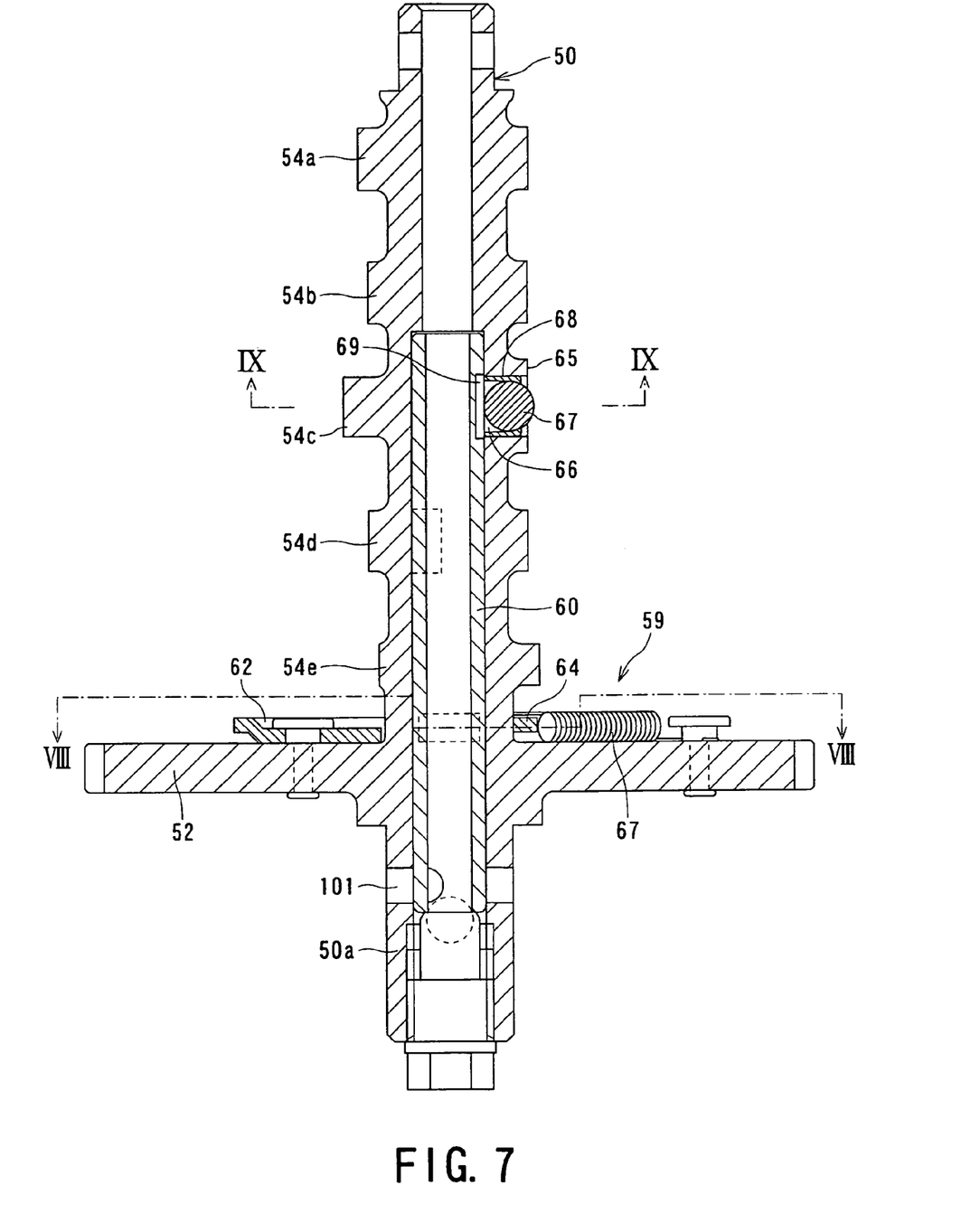
FIG. 7 is an enlarged vertical sectional view of a camshaft.
Figure 8:
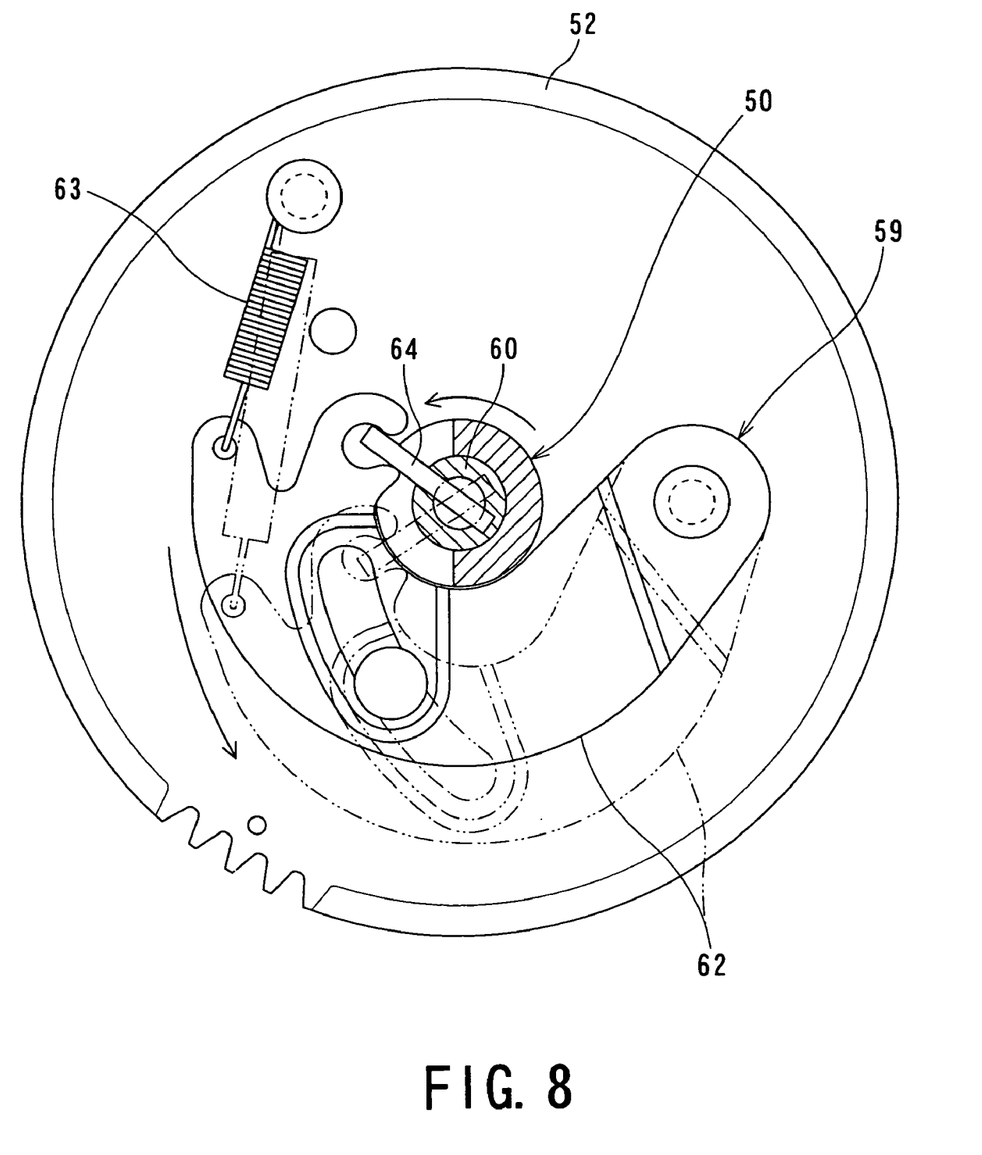
FIG. 8 is a sectional view taken along the line VIII—VIII in FIG. 7.
Figure 9A:
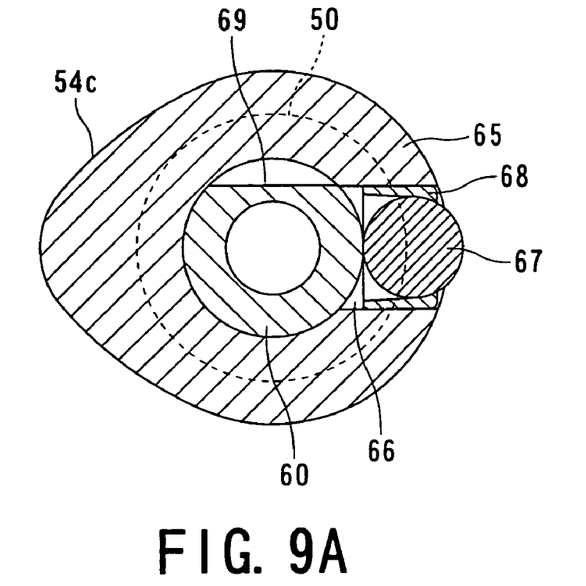
FIGS. 9A and 9B are sectional views taken along the line IX—IX in FIG. 7.
Figure 9B:
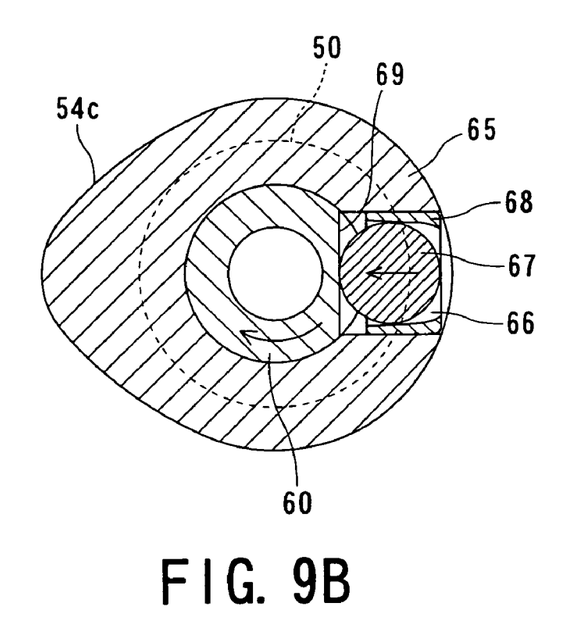

With reference to FIGS. 7 to 9, the camshaft 50 is formed so as to provide an inner hollow structure, and a decompression camshaft 60 also having an inner hollow structure is inserted into the inner hollow portion of the camshaft 50 to be rotatable in a circumferential direction. The inner hollow portions of both the camshafts 50 and 60 serve as oil passages.

On the other hand, a plate-shaped centrifugal arm 62 (which may refer simply to as an arm, hereinlater) operated by a centrifugal force is mounted on a cam driven gear 52 disposed in the camshaft 50. The centrifugal arm 62 has a structure in which a base end portion thereof is mounted on a shaft of the cam driven gear 52 so as to be freely swingable, and a spring 63 is connected to a free end portion thereof. The arm 62 is urged to be brought into contact with the camshaft 50 as shown by a solid line in FIG. 8 at a time when the camshaft 50 stops, that is, the engine 2 stops. On the other hand, when the engine 2 starts and the camshaft 50 is rotating at a predetermined rotational speed, the centrifugal arm 62 is swung in the radial direction of the cam driven gear 52 about the base end portion by the centrifugal force as shown by the chain and double-dashed line in FIG. 8.

The decompression camshaft 60 is provided with a pin 64 protruding in the radial direction thereof, and a free end portion of the arm 62 is engaged with a protruding end of the pin 64. When the engine 2 starts and the centrifugal arm 62 is swung by the centrifugal force at the predetermined rotational speed, the decompression camshaft 60 is rotated in the circumferential direction in an inner portion of the camshaft 50 interlocking with the swinging motion of the arm 62.

Further, a communication hole 66 which communicates an outer peripheral surface with an inner peripheral surface of a cam base circle 65 is formed, for example, in the cam base circle 65 of the cam 54c for the exhaust valve of the starboard side cylinder 37R among a plurality of cams 54a to 54e provided on the camshaft 50, and a steel ball 67 is inserted in this communication hole 66 so as to be held therein by a stopper member 68.

Till the engine 2 reaches the predetermined rotational speed from the engine operation stop period, the steel ball 67 is pressed by an outer peripheral surface of the decompression camshaft 60 so as to protrude from an outer peripheral surface of the cam base circle 65, as shown in FIG. 9A, and the protruding portion pushes the push rod 57 and operates to decompress the combustion chamber 40 at the engine operation starting time. On the other hand, when the engine 2 starts and the camshaft 50 is rotated so as to reach the predetermined rotational speed, the decompression camshaft 60 is rotated in the circumferential direction inside the camshaft 50 in associated with the swinging motion of the arm 62. However, a notch 69 is formed to a portion of the outer peripheral surface of the decompression camshaft 60, and when the decompression camshaft 60 is rotated and a position of the notch 69 accords with the location of the communication hole 66, as shown in FIG. 9B, the steel ball 67 is received in the hole 66 in a fashion not protruding from the outer peripheral surface of the cam base circle 65, thereby interrupting the decompressing operation.

An intake manifold 70 is connected, at a downstream side thereof, to the inlet 46 of the intake port 44 opened to the upper surfaces of both the cylinder heads 38L and 38R. One carburetor 72 is arranged, above the engine 2 in a space of the V-bank 49 between the cylinders and on an engine center line 71, in a state in which an intake passage 73 thereof is directed in a longitudinal direction (refer to FIG. 4), and the intake manifold 70 is also connected, at its upstream side, to a downstream side of the intake passage 73 forming a rear side of the carburetor 72. The intake manifold 70 is connected to the inlet 46 of each of the intake ports 44 while being branched into right and left sides on the way thereof so as to be curved toward a lower side after extending to a rear side from the connection portion to the carburetor 72. The intake system of the outboard motor of the present invention is provided with a throttle control device, preferably, the carburetor 72 as described herein, and in an alternate arrangement, a throttle body provided with a fuel injection device may be arranged in place of the carburetor 72, though not shown in detail.

An intake silencer 74 is arranged on an upper surface of the flywheel cover 34 in front of (an upstream side) of the carburetor 72. The intake silencer 74 is provided with an air intake port 75 disposed, for example, on the starboard side so as to be directed to the lower side and constructed to intake the air from the space on the right side of the carburetor 72. An inner portion of the intake silencer 74 is formed with an air passage 77 having a labyrinth structure by a vertical wall 76, and an upstream side of the intake passage 73 of the carburetor 72 is connected to a downstream end of the air passage 77. An air introducing duct 78 for introducing air taken from the air intake port 8 formed on the rear upper side of the upper cover 7 is arranged at the inner surface of the upper cover 7 on the side opposite to the air intake port 75 of the intake silencer 74, i.e., the portside in the present embodiment with the carburetor 72 being interposed between the duct 78 and the intake port 75.

The crankcase 28 has an approximately plate shape and is connected to the lower surface portions of the cylinder block 29 and the cylinder heads 38L and 38R which are connected in the horizontal direction. The crankcase 28 is also provided with a pair of right and left exhaust passages 79 penetrating in its vertical direction, and the exhaust passages 79 have upper openings which are connected to the outlet 47 of the exhaust port 45 opened to the lower surfaces of the cylinder heads 38L and 38R.

The oil pan 4 is connected, at its upper surface, to the lower surface of the crankcase 28.

Figure 10:
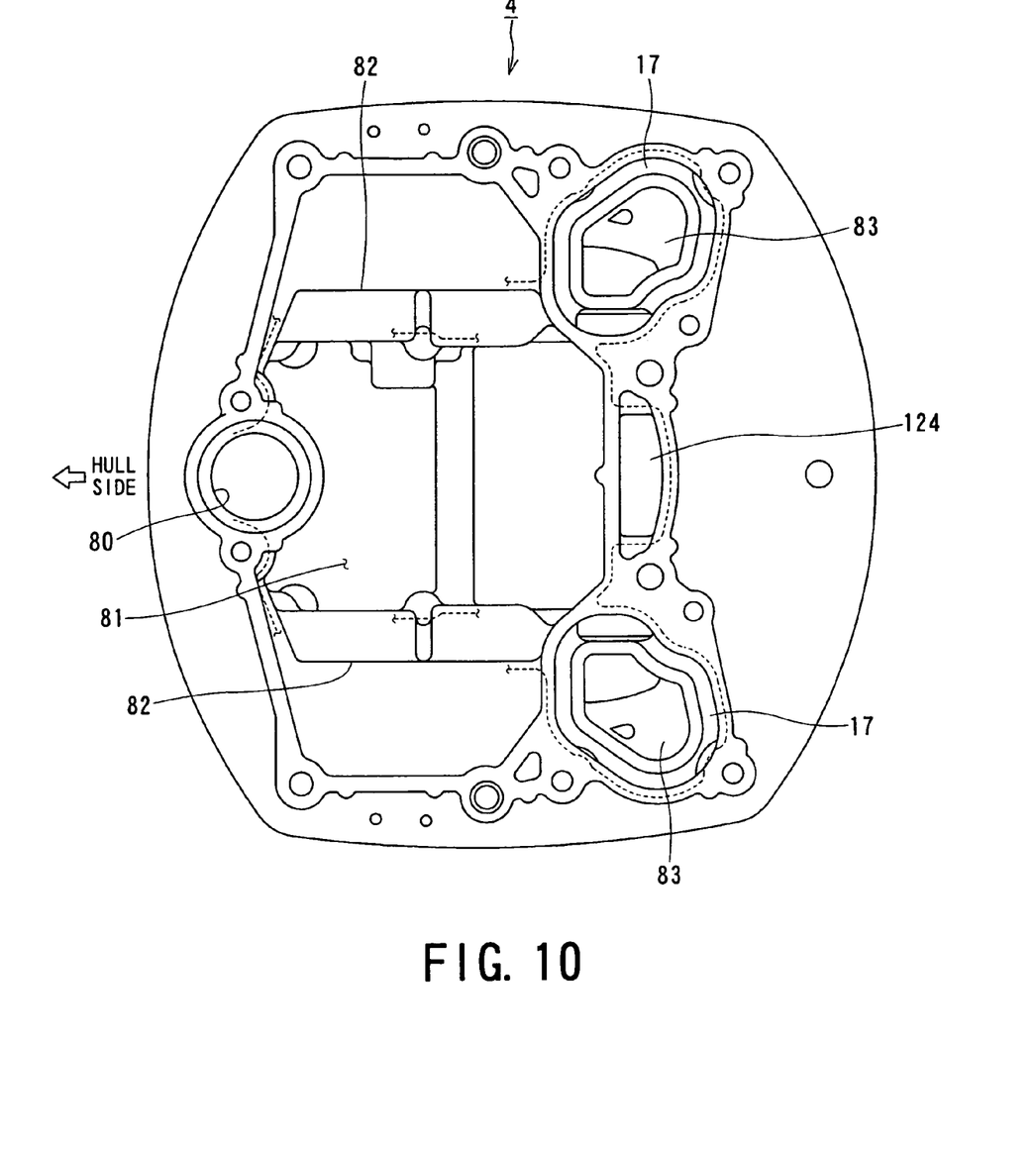
FIG. 10 is a top plan view of an oil pan of the outboard motor.
Figure 11:
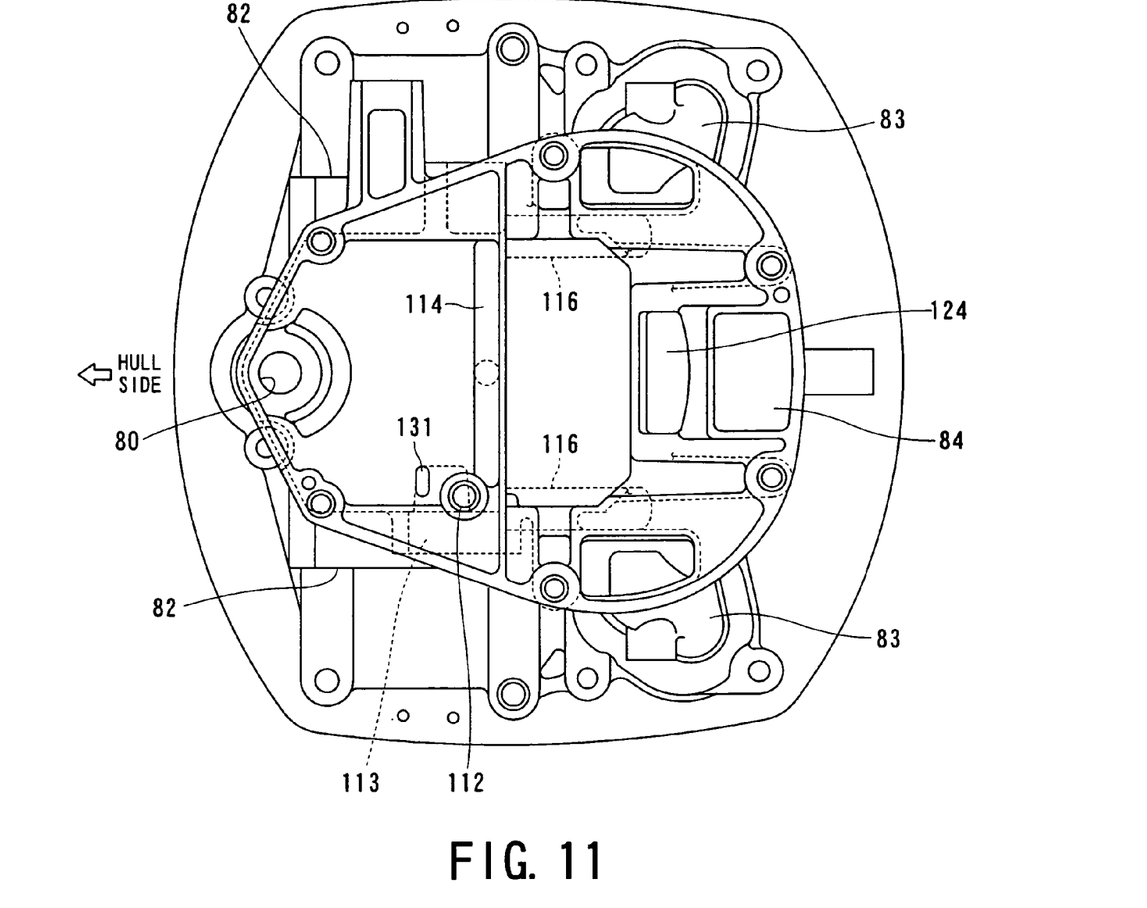
FIG. 11 is a bottom plan view of the oil pan.

Next, with reference to FIGS. 1, 10 and 11, a shaft hole 80, through which the drive shaft 10 is inserted, is formed in a vertical direction in the front portion of the oil pan 4, and a lubricating oil reservoir 81 is formed at a rear portion of this shaft hole 80 on the side close to the front portion of the oil pan 4. Furthermore, mount members or portions 82 for a pair of right and left upper mount units 25 are formed to both side portions of the lubricating oil reservoir 81, and a pair of exhaust passages 83 penetrating the oil pan 4 in the vertical direction are also formed at the obliquely rear side portion of the mount member 82.

The exhaust passages 83 formed in the oil pan 4 have upper openings, which are connected to the outlet of the exhaust passage 79 opened to the lower surface of the crankcase 28 and also have lower openings opened to face an inner side of the drive shaft housing 9. Further, an exhaust (gas) release chamber 84 is formed on the most rear side of the central portion of the oil pan 4.

The lubricating oil is supplied to the oil pan 4 from an oil filler port 85 formed in the portside side surface of the cylinder block 29, and the oil filter port 85 is closed by a detachable oil cap 87 which is integrally provided with an oil level gauge 86. The lubricating oil in the oil pan 4 is introduced into the main components of the engine 2 by means of a lubricating arrangement. Furthermore, a recessed portion 88 is formed, through a casting process, to the lower surface of the crankcase 28 positioned at the lower end of the camshaft 50, and an opening portion of the recess 88 is covered by a plate 89, thereby forming a pump chamber 90 inside the recess 88. An oil pump 91 connected at the lower end of the camshaft 50 to be driven is received in the pump chamber 90.

In the illustrated embodiment, an oil filter 92 filtering the lubricating oil is further arranged on the side surface of the cylinder 37R in the right side (the starboard side), offset to the upper side, so as to face the forward moving direction of the hull 16. The oil filter 92 is arranged on the portside surface of the cylinder block 29 toward the front side of the engine 2 so that an axis 93 of the oil filter 92 is orthogonal to an axis 94 of the portside cylinder 37R. The oil filter 92 is mounted to be detachable in the approximately horizontal direction.

Further, although a detailed illustration is omitted herein, a first oil passage 95 from the pump chamber 90 to the oil filter 92 is formed by covering, by the plate 89, a recess, not shown, formed through the casting process to the lower surface of the crankcase 28 in the same manner as that of the pump chamber 90. A second oil passage 96 is also formed so as to extend from a downstream end of the first oil passage 95 toward the oil filter 92 in the cylinder block 29 at the side portion of the starboard side cylinder 37R in which the second oil passage 96 is arranged in a manner offset to the upper side. Furthermore, although a detailed illustration thereof is also omitted herein, a check valve, in which an oil relief hole is opened to an upper side, is arranged at an intermediate portion of the first oil passage 95.

The lubricating oil filtered through the oil filter 92 is supplied to the bearings 30 and 31 supporting the upper and lower sides of the crankshaft 3 by a main gallery 97 extending in parallel to the crankshaft 3 in the cylinder block 29. A part of the lubricating oil supplied to the bearing 30 supporting the upper side of the crankshaft 3 is then supplied to a crankpin 99 through an oil hole 98 formed in the crankshaft 3 to lubricate a large end portion 43a of the connection rod 43.

On the other hand, a part of the lubricating oil supplied to the bearing 31 supporting the lower side of the crankshaft 3 is then supplied to a lower journal 50a of the camshaft 50 through a third oil passage 100 formed in the crankcase 28. As mentioned above, the inner portions of the camshaft 50 and the decompression camshaft 60 are formed as the hollow structures serving as the oil passage, and the lubricating oil supplied to the lower journal 50a of the camshaft 50 flows over the upper end of the camshaft 50 through the inner portions of both the shafts 50 and 60 from an oil hole 101 formed in the journal 50a so as to lubricate each of the cams 54a to 54e formed on the camshaft 50.

Figure 4:
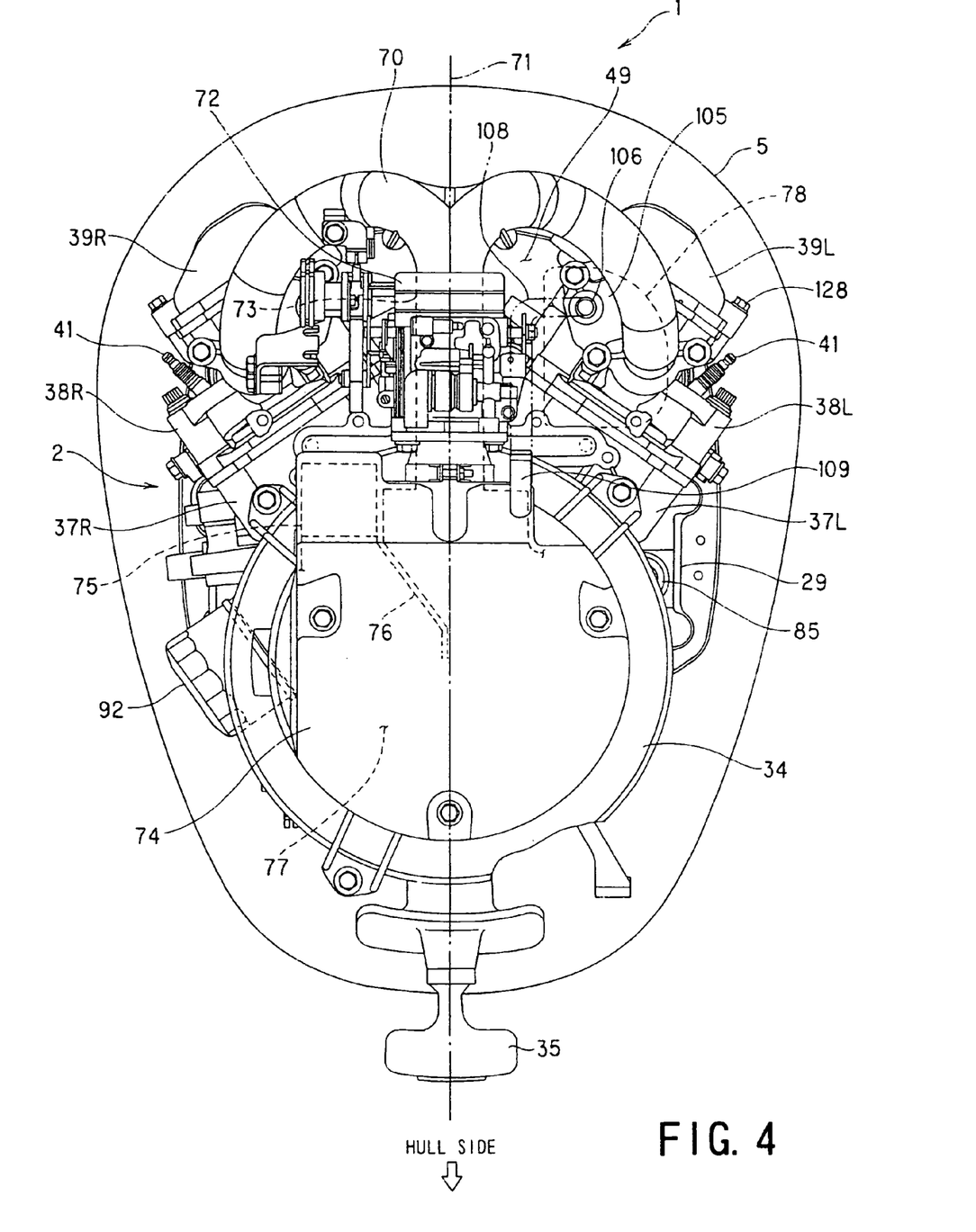
FIG. 4 is a view seen from an arrow IV in FIG. 1 showing a top side of the engine.
Figure 5:
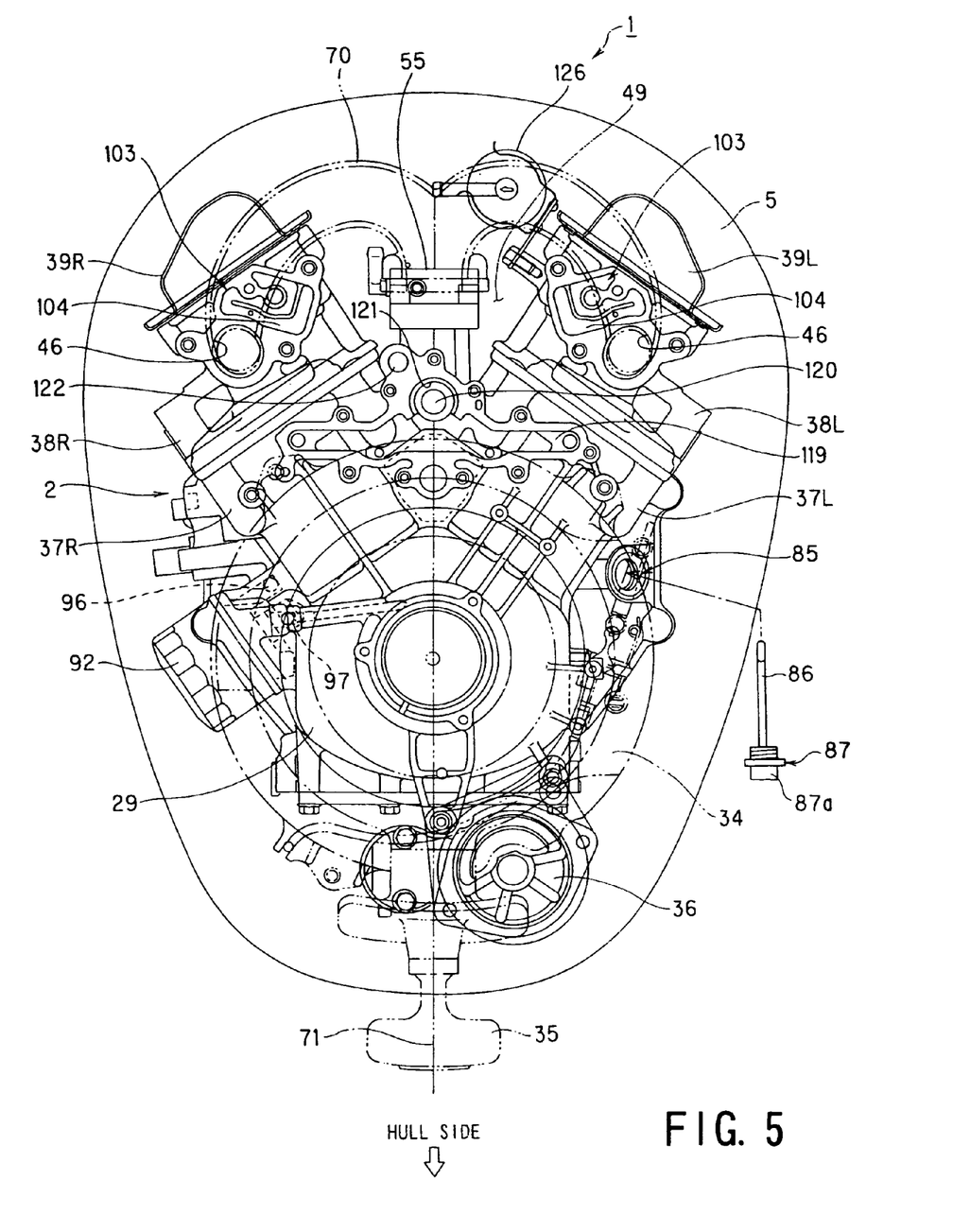
FIG. 5 is a top plan view showing a state in which a recoil starter, a flywheel magnet and a flywheel cover are detached.
Figure 6:
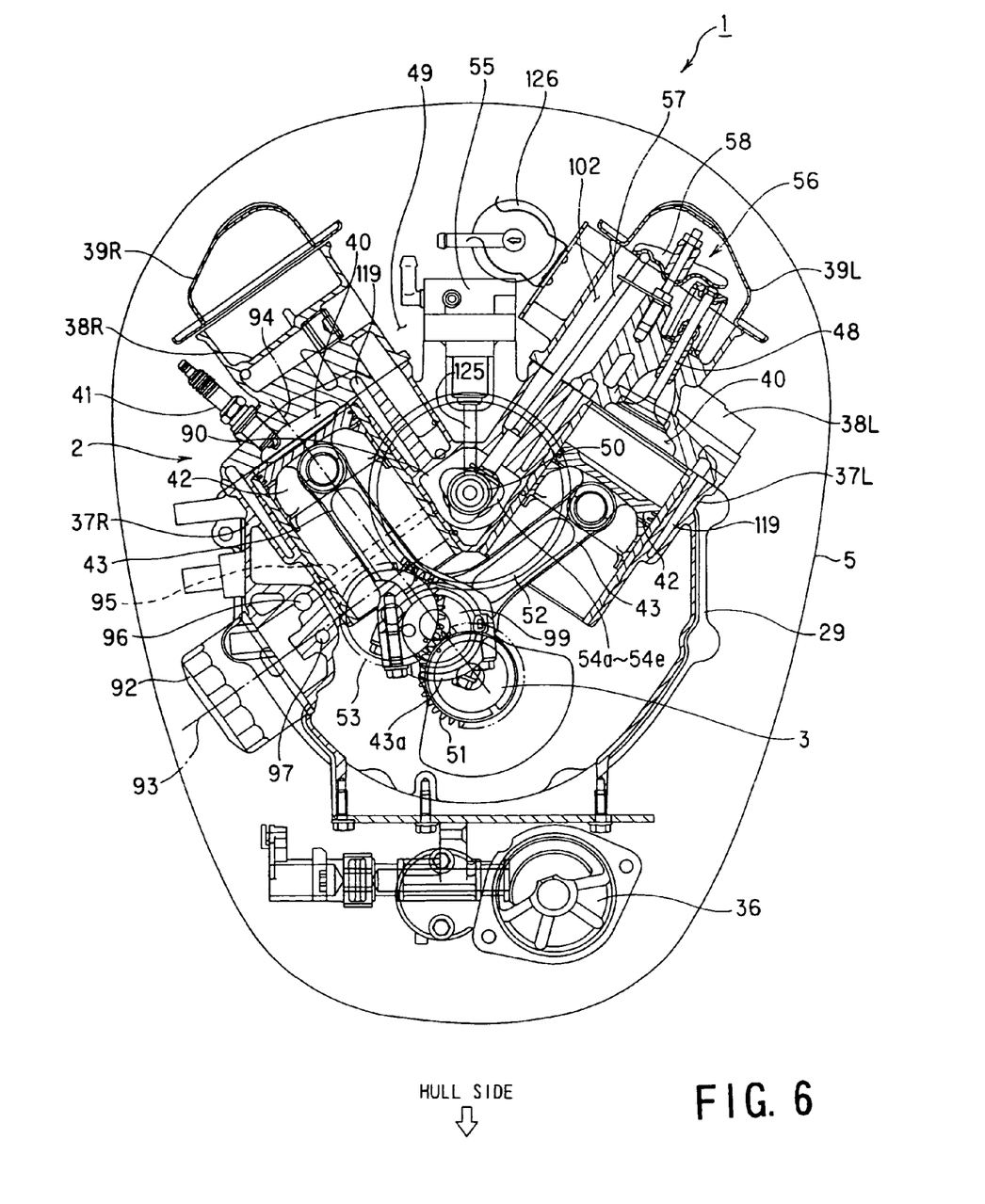
FIG. 6 is a cross sectional view taken along the line VI—VI in FIG. 1.

On the other hand, the components constituting the valve train, such as the rocker arm 58, are lubricated by introducing blowby gas to the cylinder heads 38L and 38R. The blowby gas is generated such that a gas accompanying a pressure generated in the cylinders 37L and 37R leaks out into the crankcase 28 little by little through a gap between the piston 42 and each of the cylinders 37L and 37R, and the blowby gas is introduced into the cylinder heads 38L and 38R through the accommodation space 102 of the push rod 57. Since the blowby gas contains a sprayed oil component or oil mist, a breather chamber 103 for separating the oil component from the gas component is provided. The breather chamber 103 is formed by covering a recessed portion having a labyrinth structure formed near an inlet of the intake port 44 opened to the upper surfaces of both the cylinder heads 38L and 38R, as shown in FIG. 5, by a cover body 105 integrally formed, in the mount member 82 of the intake manifold 70, to the cylinders 38L and 38R, as shown in FIG. 4.

In the blowby gas in which the gas and the liquid are separated by the breather chamber 103, the oil component flows back in the cylinder heads 38L and 38R. Unions 106 and 107 are respectively provided in the cover body 105 of the mount member 82 of the intake manifold 70 to the cylinder heads 38L and 38R and the intake silencer 74. These unions 106 and 107 are connected by a breather hose 108, thereby flowing back the gas component in the breather chamber 103 to the intake silencer 74 so as to be re-burned in the combustion chamber 40.

By the way, as mentioned hereinbefore, in the illustrated embodiment of the present invention, the engine 2 mounted on the outboard motor 1 is water-cooled type. In an example of a particular structure of the cooling device, a water intake port 109 is formed to the side surface of the gear case 11, and a cooling water such as seawater, lake water or the like taken from the water intake port 109 is fed, under pressure, toward the lower portion of the oil pan 4 via a water tube 111 by a water pump 110 driven by the drive shaft 10.

The cooling water introduced into the lower portion of the oil pan 4 is then guided to a water pressure valve chamber 113 formed to the starboard side surface of the oil pan 4 from a cooling water introducing port 112 formed to the lower surface of the oil pan 4 through a passage 130.

A branch hole 114 is formed in the water pressure valve chamber 113, and a water pressure valve 115 is opened in the case that a pressure of the cooling water reaches a predetermined value or more. Then, the cooling water passing through the water pressure valve 115 is returned into the drive shaft housing 9 through a return hole 131. In the case wherein the pressure of the cooling water reaches the predetermined value or less, and the water pressure valve 115 is closed, the cooling water passes through the water pressure valve chamber 113 as it is, and the cooling water is introduced into an exhaust gas cooling water jacket 117 formed in the periphery of a pair of right and left exhaust passages 83 penetrating the oil pan 4 in the vertical direction from the branch hole 114 via cooling water passages 116 formed in a bottom surface and a side surface of the oil pan 4.

The cooling water is thereafter introduced into the other exhaust gas cooling water jacket 118 formed to the peripheral portion of the exhaust gas passage 79 of the crankcase 28 while cooling an entire periphery of the exhaust gas passage 83. Then, the cooling water is guided to a cooling water jacket 119 for the engine 2 formed in the cylinder heads 38L and 38R and the cylinders 37L and 37R, thereby cooling the engine 2. The cooling water cooling the engine 2 is introduced to a thermostat chamber 121, in which a thermostat 120 is arranged at the central portion of the V bank 49, from the upper portions of the left and right cylinders 37L and 37R. Then, the cooling water introduced to the thermostat chamber 121 passes through the thermostat 120 after reaching a predetermined water temperature or more and passes through a cooling water return passage 122 integrally formed in the cylinder block 29 in the V bank 49. The cooling water is discharged into the drive shaft housing 9 via a cooling water return passage 123 formed between the right and left exhaust passages 79 of the crankcase 28 and a cooling water return passage 124 formed between the right and left exhaust passages 83 positioned to the rear portion of the lubricating oil reservoir 81 of the oil pan 4. Then, the cooling water is discharged out of the outboard motor together with the exhaust gas.

A fuel pump 55, of mechanical structure, constituting an auxiliary component of a fuel system is arranged in the V bank 49 between the left and right cylinders 37L and 37R and in the lower space of the intake manifold 70. The fuel pump 55 is driven, through a push rod 125, by the fuel pump driving cam 54e formed to the camshaft 50. A fuel filter 126 constituting another auxiliary component of the fuel system is also arranged between the left and right cylinder heads 38L and 38R in the upper side of the fuel pump 55.

Figure 2:
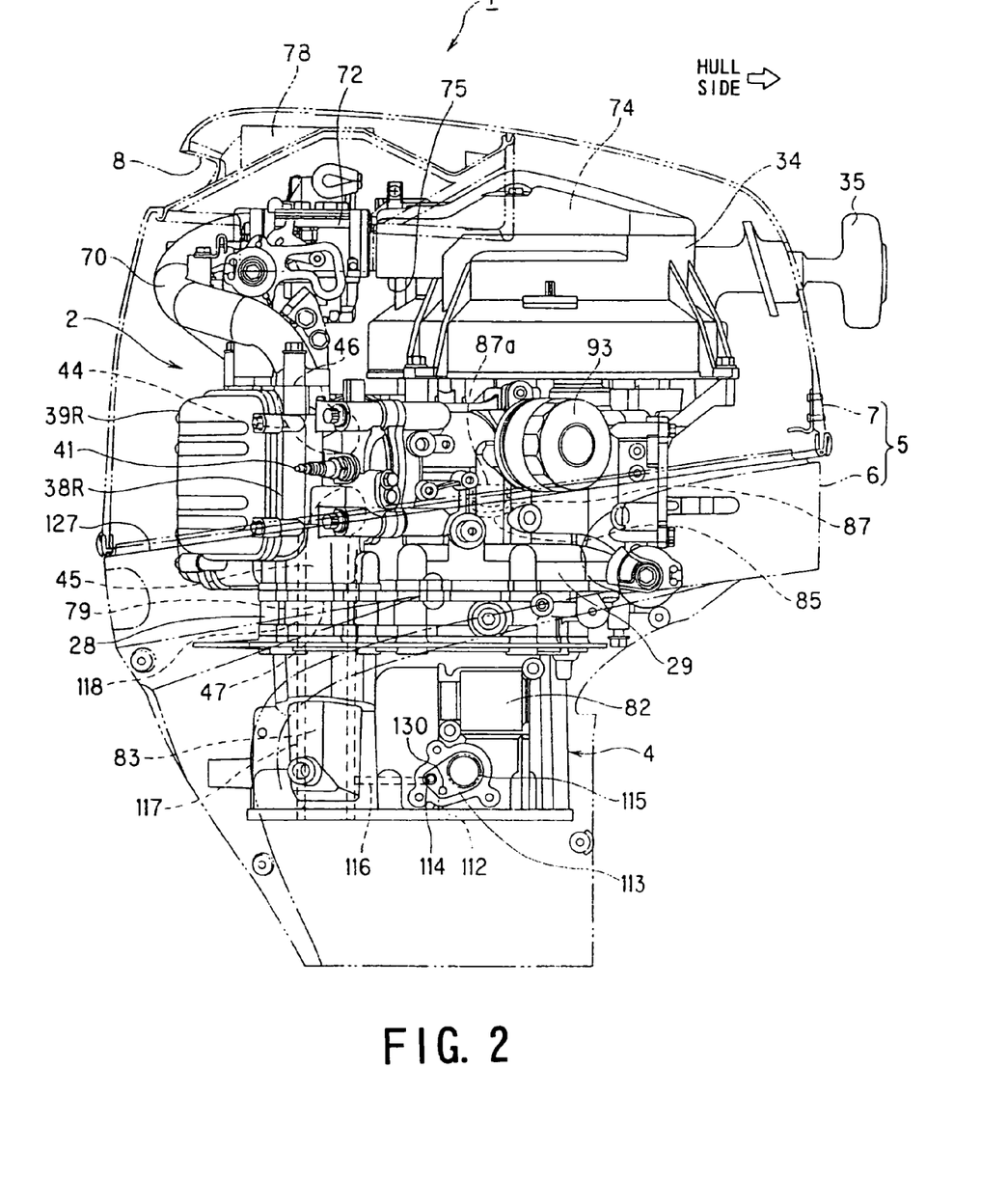
FIG. 2 is a right side elevational view of an engine of the outboard motor of FIG. 1.
Figure 3:
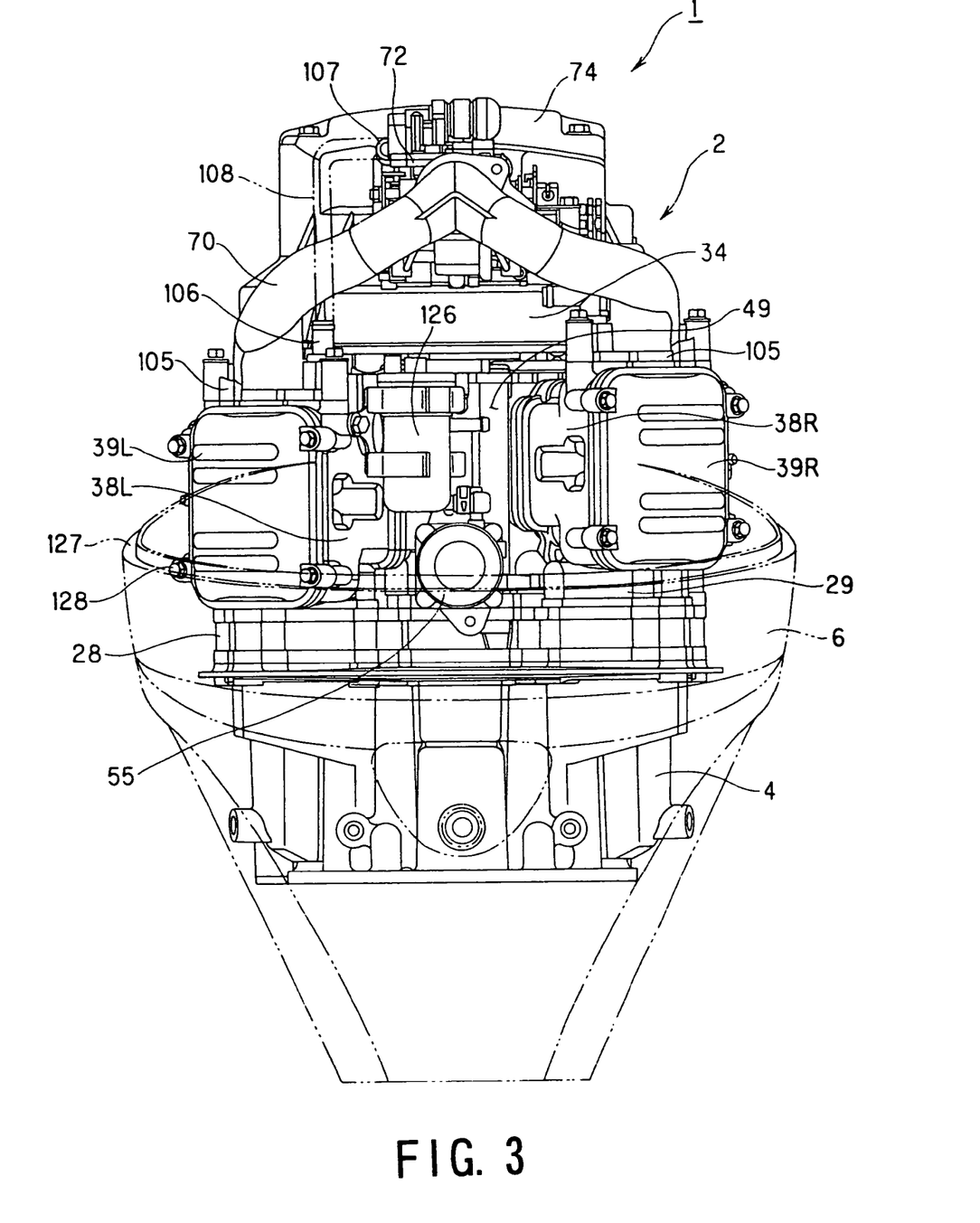
FIG. 3 is a rear side view of the engine.

In the outboard motor 1, in order to improve the maneuverability and maintainability thereof, for example, as shown in FIGS. 2 and 3, a vertical division line of the engine cover 5, that is, a mating surface 127 between the upper cover section 7 and the lower cover section 6 is set so as to provide a rearward descending shape at a position of an outer lower side fastening member such as a bolt 128 of the head cover 39R of the right cylinder 37R, in the illustrated embodiment, which is offset to the lower side, and a position lower than the oil filter 92, a grip portion 87a of the oil cap 87 provided with the oil level gauge 86, and the spark plug 41. It is therefore possible to easily access to each of the portions only by dismounting the detachable upper cover section 7.

The outboard motor of the present invention of the structure mentioned above will operates as follows.

In the outboard motor of the structure mentioned above, the oil pan 4 is disposed below the V-type engine and the lubricating oil reservoir 81 is formed in front of the oil pan 4. A pair of right and left exhaust gas passages 83 are arranged so as to penetrate the oil pan 4 in the vertical direction, and the cooling water return passage 124 is formed between the exhaust passages 83. These exhaust gas passages 83 and the cooling water return passage 124 are formed in the rear side of the storage portion, i.e., lubricating oil reservoir, 81. Accordingly, the lubricating oil, as a heavy subject, is collected to a portion to the front side of the outboard motor 1. As a result, the gravity point of the outboard motor comes reaches the tilt shaft 19, so that the tilt-up operation of the tilt shaft of the outboard motor can be easily performed without using any assist components or like, which is conventionally required.

In addition, the outboard motor 1 has a design such that the mating surface 23 between the lower surface of the engine 2 and the upper surface of the oil pan 4 is positioned to a portion upper than the horizontal line 24 passing through the tilt shaft 19, so that the oil pan 4 can be arranged at the high position. As a result, the gravity point of the outboard motor becomes also higher, and hence, it is possible to easily execute the tilt-up operation of the outboard motor 1.

Furthermore, since the attaching portion 82 of a pair of right and left upper mount units 25 is formed to each of both side portions of the lubricating oil reservoir 81 in the oil pan 4, it is possible to reserve the lubricating oil at further front side portion inside the storage portion 81, and the gravity point further comes to the tilt shaft 19.

Still furthermore, the engine 2 is equipped with the overhead valve (OHV)-type valve train 56, so that it is possible to arrange the camshaft 50 having a heavy weight on the side close to the front crankshaft 3, and it is possible to make the cylinder heads 38L and 38R and the head covers 39L and 39R compact in size and light in weight. Accordingly, the gravity point of the outboard motor comes to the front side, and hence, the tilt-up operation of the outboard motor can be easily performed without using any assist device, which is required in the prior art.

It is further to be noted that the present invention is not limited to the described embodiment and many other changes and modifications may be made without departing from the scopes of the appended claims.

What is claimed is:

1. An outboard motor comprising:
   a four-stroke-cycle engine in which a crankshaft is vertically disposed and a cylinder block including cylinders and cylinder head is arranged and from which a drive shaft extends vertically downward in a state that the outboard motor is mounted to a hull through a bracket assembly;
   an oil pan disposed below the engine;
   an engine cover covering the engine and the oil pan;
   an intake system having an intake port formed to the cylinder head of the engine;
   an exhaust system having an exhaust port formed to the cylinder head of the engine; and
   a driving mechanism operatively connected to the drive shaft extending from the engine,
   wherein said oil pan is provided with a lubricating oil reservoir disposed at a front portion of the oil pan, and an exhaust passage and a cooling water passage are formed on a rear side of the lubricating oil reservoir and wherein the outboard motor is attached to the bracket assembly via an upper mount unit, and a mounting portion of the upper mount unit is formed to each of both side portions of the lubricating oil reservoir of the oil pan.

2. An outboard motor according to claim 1, wherein said engine is a V-type four-stroke-cycle engine and said exhaust passage includes a pair of exhaust passage sections vertically penetrating the oil pan.

3. An outboard motor according to claim 2, wherein the cooling water passage includes an exhaust cooling water jacket arranged so as to surround the paired exhaust passage sections.

4. An outboard motor according to claim 1, wherein the bracket assembly includes a tilt mechanism having a tilt shaft by which the outboard motor is supported to be tiltable in a vertical direction about the tilt shaft and a mating surface between a lower surface of the engine and an upper surface of the oil pan is set to a portion higher than a horizontal line passing through an axis of the tilt shaft.

5. An outboard motor according to claim 1, wherein the engine includes a valve train of an overhead valve (OHV) structure.

* * * * *